Patented July 13, 1926.

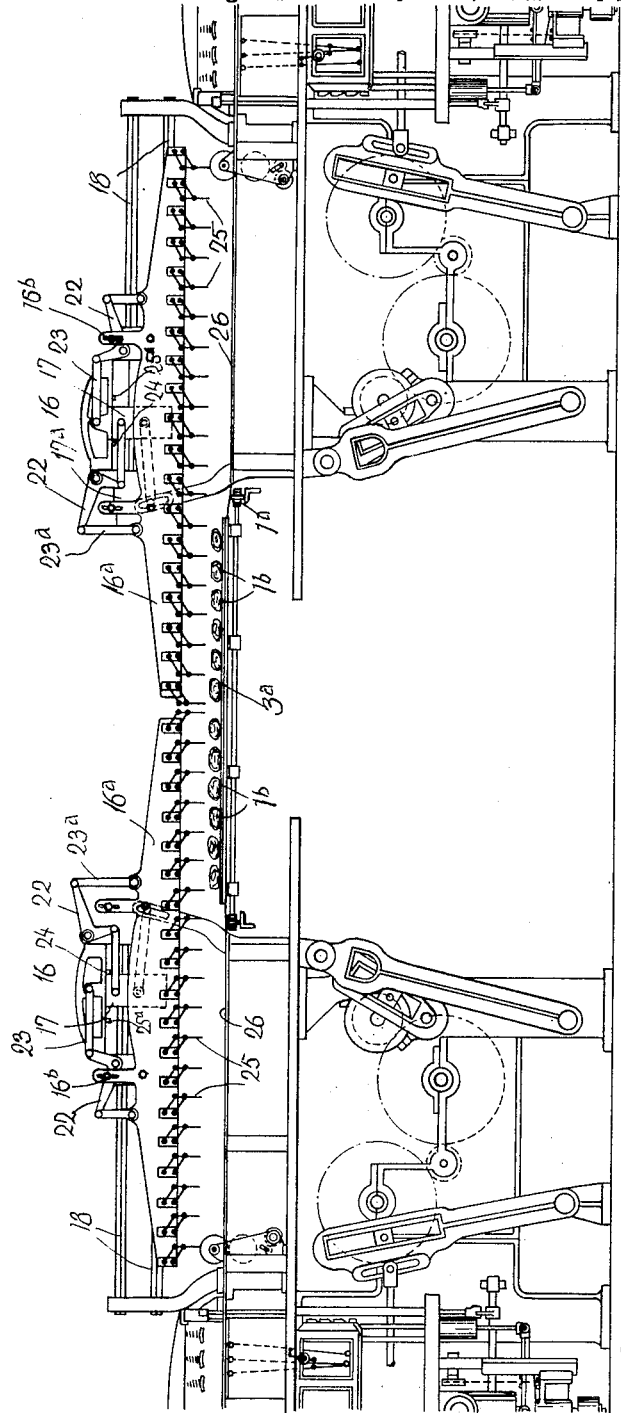

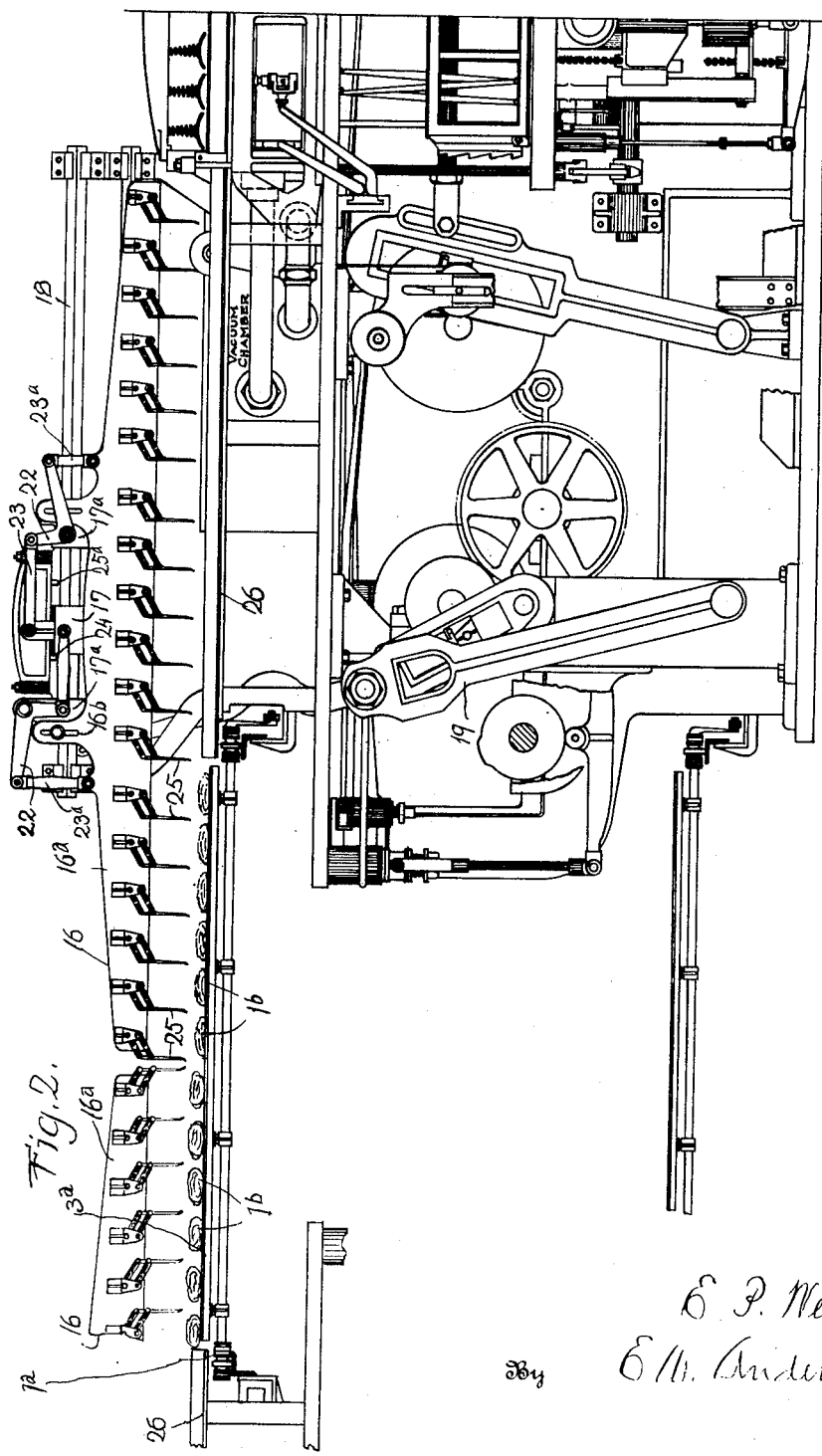

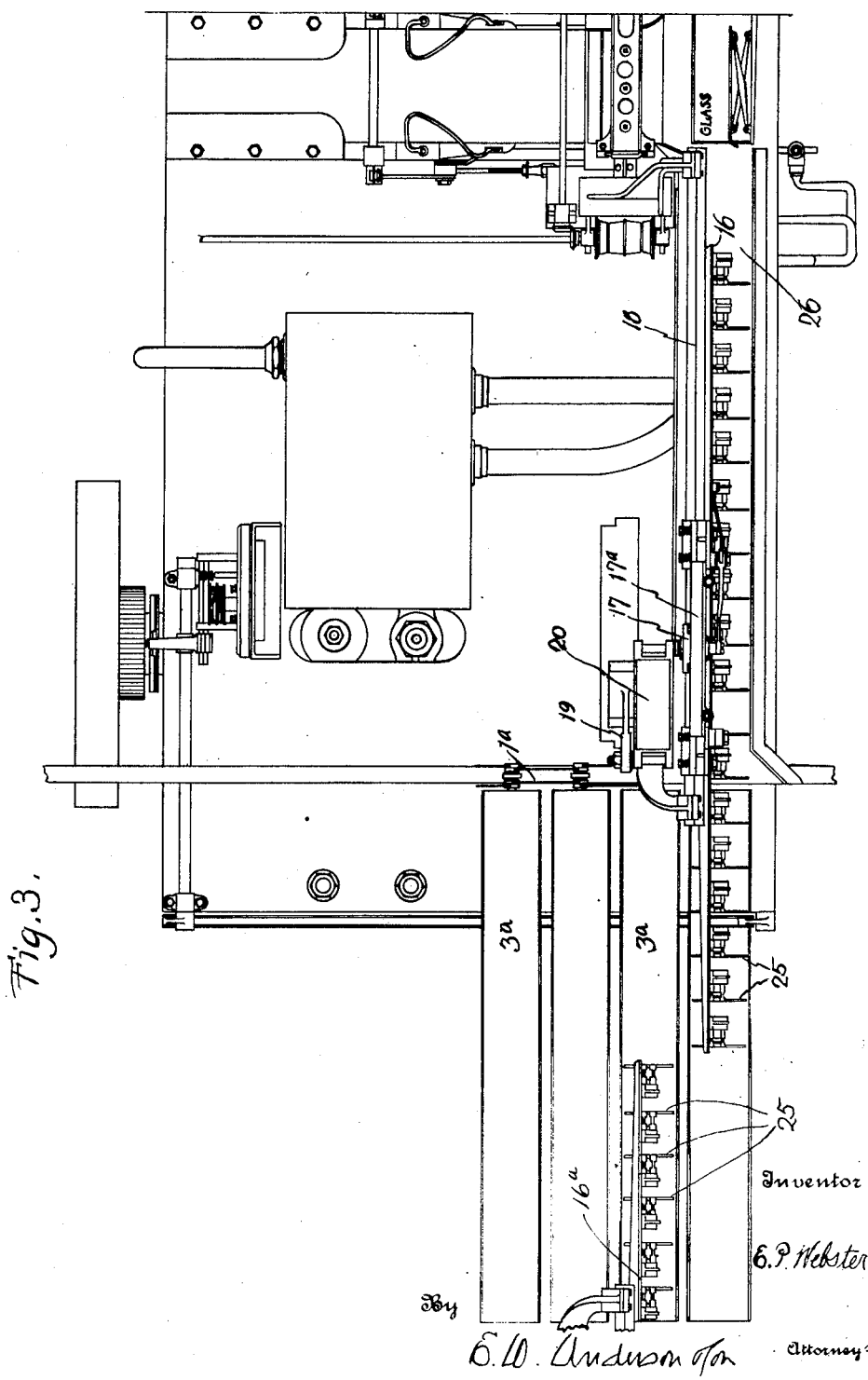

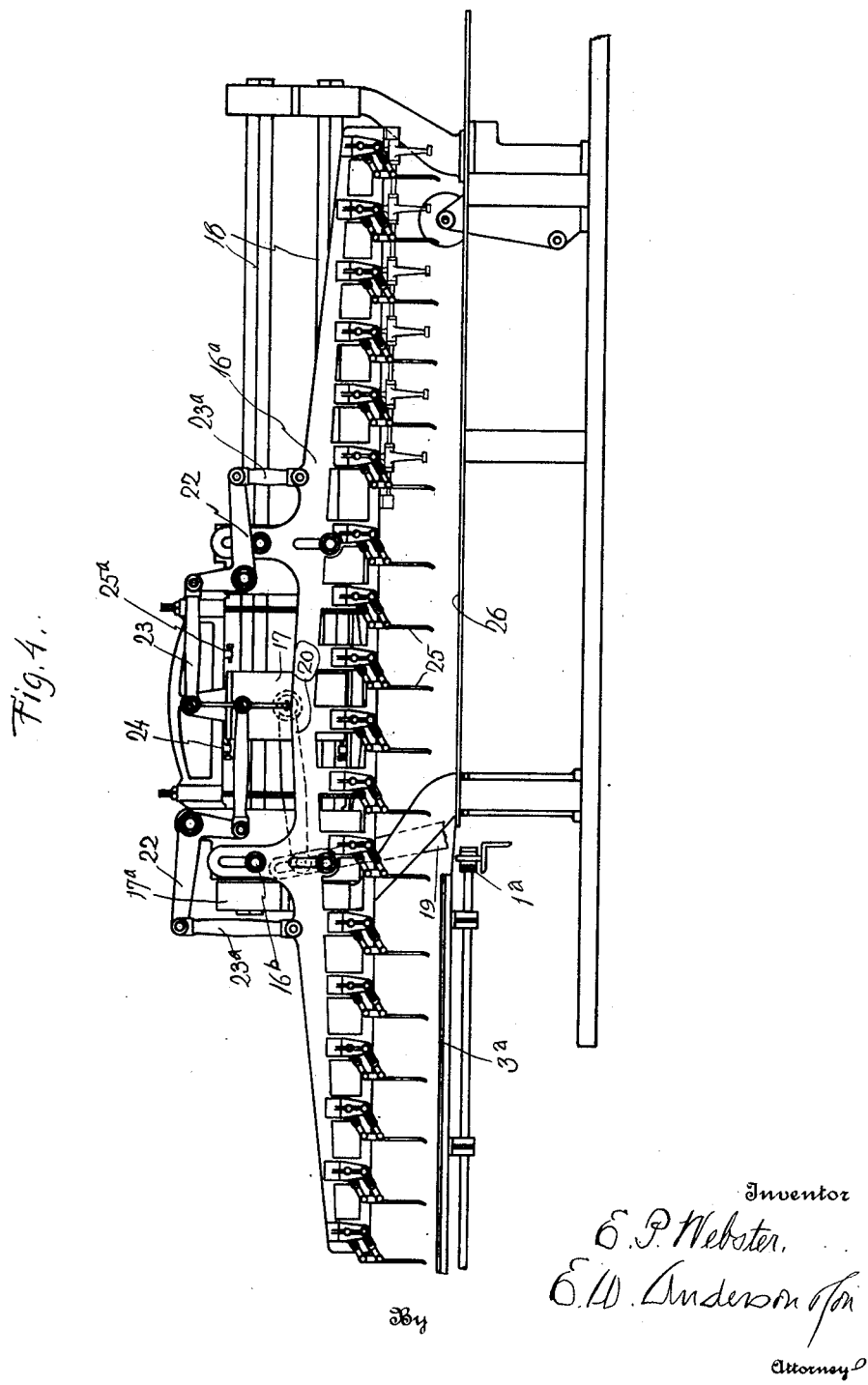

1,592,316

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

BISCUIT-REMOVAL MEANS.

Application filed September 21, 1922, Serial No. 589,719. Renewed October 12, 1925.

This invention relates to apparatus for the manufacture of food products, such as biscuit, of the type in which the uncooked articles are carried on a conveyor through an oven to be baked, after which the articles are removed from the conveyor and delivered to a packing station where they are placed in cartons. More particularly, the present invention relates to a device for removing the cooked articles from the conveyor after baking, and this device is arranged to remove the articles and deliver them in groups to automatic mechanism by which the articles are packed in selected quantities in cartons.

The object of the present invention is to provide a device by which articles of a fragile character may be rapidly removed from the conveyor, each article being kept from injury during this operation and being under exact control so that at each operation of the device a group or groups of articles are delivered to a packing station in such arrangement that these articles may readily be introduced into cartons by appropriate mechanism.

One form of conveyor which is used in the apparatus referred to, is provided with pans or trays on which the articles are carried through the oven, and this conveyor is arranged for a slow, continuous movement as a whole, while parts of the conveyor are given an intermittent movement. The device of the present invention is arranged for operation in connection with an intermittently moving portion of the conveyor and operates to deliver groups of the articles to packing machines disposed on opposite sides of the conveyor. The mechanism includes reciprocating heads which extend over the transverse baking pans of the conveyor, and on these heads are spaced members which contact each with an article in a row on the pan. The heads reciprocate toward each other to a position in which each head overlies a part of a pan. Then the heads are lowered so that the individual members enter the spaces between adjacent articles on the pan, and in this lowered position the heads are reciprocated away from each other, sliding the articles from the pans in a row to a suitable platform. At the end of this movement the heads are raised so that the members for contacting with the individual articles are now disengaged from the latter; then the heads returned to their original position, and the operation is repeated. The movement of the heads is timed properly with relation to the movement of the conveyor so that the removal of the articles occurs while the conveyor is at rest.

One form of the invention suitable for use in connection with the manufacture of cereal biscuits, such as shredded wheat biscuits, is illustrated in the accompanying drawings, in which—

Figure 1 is a side view partly diagrammatic of the biscuit removal means, parts being removed and parts broken away, and the baking conveyor being shown in transverse section.

Figure 2 is a similar view on a larger scale, with a greater portion broken away upon one side of the invention.

Figure 3 is a plan view of the portion of the invention shown in Figure 2.

Figure 4 is a detail side view of one of the rakes, and parts adjacent thereto, parts being broken away.

Referring now to the drawings, the conveyor on which the biscuits are carried through the oven for baking includes a conveyor chain 1ª, which carries transverse pans or trays 3ª. Each of these pans receives a row of biscuits 1ᵇ at one point in the travel of the conveyor and as these biscuits are moved through the oven and baked they are carried by the conveyor to the biscuit removal device, generally designated 16. The conveyor is preferably arranged for a slow, continuous movement as a whole, while parts of the conveyor are given an intermittent movement of advance, and the pans or trays from which the biscuits are to be removed lie in this portion, so that the pans are brought one after another into registry with the removal device 16.

The biscuit removal device includes two reciprocating members or rakes of identical construction. Each rake includes a head 17, slidably mounted on a rod 18 and reciprocated transversely of the conveyor by a rock lever 19, which has a link connection 20 with the head. The head consists of a main head 17ª and a supplementary head designated 17, this supplementary head receiving a reciprocating movement of greater degree than the head 17ª in the operation of the device.

The rake 16 has a frame 16ª, which is provided with a slot and pin connection 16ᵇ with the head 17ª, whereby it is moved as a unit with said head horizontally, but is capable of independent vertical reciprocatory movement.

The head 17 is moved in one direction by the aforesaid lever and link towards the conveyor 1ª, to thereby operate the bell levers 22, through links 23 and 23ª, and elevate the rake frame 16ª, until the head 17 contacts with the stops 24 of the head 17ª, after which the two heads 17 and 17ª are moved as a unit, the rake being in elevated position, until the rake is properly located over the conveyor 1ª.

In the return movement of the parts, the head 17 is first moved to operate the bell levers 22 and depress the rake 16, so that its teeth 25 will engage between six of the biscuit in the tray 3ª of the conveyor, after which the said head contacts with stops 25ª and the heads 17 and 17ª are moved as a unit with the rake in depressed position, to remove a row or plurality of six aligned biscuit horizontally from said conveyor and transversely thereof, during the stoppages consequent upon the intermittent movement of the conveyor.

Upon each stroke of the rake 16, six biscuit are removed from the aligned tray 3ª of the conveyor upon an inspection table 26, leading to a machine for packing biscuit into cartons or boxes.

Owing to the fact that the rake 16 operates horizontally to remove biscuit of delicate nature, its speed of operation is limited, and considerable time is needed to remove an aligned row of biscuit, dependent upon the number so removed in a row. The speed of operation of the rake 16 is further limited by the capacity of the packing machine for the biscuit. It therefore becomes desirable first to remove the biscuit individually from the conveyor at the proper rate of speed, and collectively or as a whole to remove the biscuit more rapidly than would ordinarily be possible, and to adapt the biscuit removal device to supply more than one packing machine, whereby the production of packed biscuit will be increased.

To this end, the conveyor 1ª is adapted to carry 12 aligned biscuit to each tray or pan thereof, six of these biscuit being removed from the open end of one tray at one side of the machine by the aforesaid rake 16, and six biscuit, being the number, added to the first six biscuit removed, that is contained in an entire row of biscuit (namely twelve) being removed from the open end of an adjacent tray 3ª at the other side of the machine by another rake 16, constructed and operated in all respects similarly to the first named rake, and supplying a packing machine for the biscuit, also located at the other side of the machine, and similar in all respects to the packing machine previously herein referred to.

It is highly desirable for purposes of economy of heat and power to have the conveyor 1ª adapted to carry 12 aligned biscuit to the tray 3ª thereof, and if a packing machine were merely duplicated and located to receive biscuit removed from the same side of the conveyor as the first named packing machine, there would still remain upon the trays of the conveyor the six biscuit remaining of the entire number of twelve biscuit contained in each tray after each stroke of the rake 16, and it is for this reason that the second packing machine is located at the opposite side of the conveyor 1ª. The two rakes 16 work in unison in opposite directions. The engagement of the oppositely working rakes 16 with adjacent trays 3ª rather than with the same tray, is for the purpose of avoiding interference of the two rakes in their working.

I claim:—

1. In biscuit removal means, a conveyor, and means for removing therefrom successive transverse rows of biscuit including automatic reciprocatory devices operating along different paths and adapted to simultaneously remove each a portion of a transverse row of biscuit.

2. In biscuit removal means, a conveyor, and means for removing therefrom successive transverse rows of biscuit, including automatic reciprocatory devices operating along different paths and in opposite directions and adapted to simultaneously remove each a portion of a transverse row of biscuit from opposite sides of said conveyor.

3. In biscuit removal means, a conveyor, and means for removing therefrom successive transverse rows of biscuit including automatic reciprocatory rake devices operating along different paths and adapted to simultaneously remove each a portion of a transverse row of biscuit and collectively to simultaneously remove a number of biscuit equal to the number contained in an entire row.

4. In biscuit removal means, a conveyor, and means for removing therefrom successive transverse rows of biscuit, including automatic reciprocatory rake devices operating along different paths and in opposite directions and adapted to simultaneously remove each a portion of a transverse row of biscuit from opposite sides of said conveyor and collectively to simultaneously remove a number of biscuit equal to the number contained in an entire row.

5. In biscuit removal means, a conveyor, means for moving the same intermittently, and horizontally reciprocatory means operating transversely of said conveyor during the stoppages consequent upon the intermittent movement thereof for removing successive transverse rows of biscuit, and including rake-heads operating along different paths and adapted to simultaneously remove each a portion of a transverse row of biscuit.

6. In biscuit removal means, a conveyor, means for moving the same intermittently, and horizontally reciprocatory means operating transversely of said conveyor during the stoppages consequent upon the intermittent movement thereof for removing successive transverse rows of biscuit and including rake heads operating along different paths and in opposite directions and adapted to simultaneously remove each a portion of a transverse row of biscuit from opposite sides of said conveyor.

7. In biscuit removal means, a conveyor including transverse trays, having lateral flanges and means for removing therefrom successive transverse rows of biscuit including automatic reciprocatory devices engaging respectively a separate tray and operating along different paths and adapted to simultaneously remove each a portion of a transverse row of biscuit.

8. In biscuit removal means, a conveyor including transverse trays having lateral flanges adapted each to carry a row of biscuit, and means for removing successive transverse rows of biscuit from said trays, including automatic reciprocatory devices engaging adjacent trays and operating along different paths and in opposite directions and adapted to simultaneously remove each a portion of a transverse row of biscuit from opposite sides of said trays and collectively to simultaneously remove a number of biscuit corresponding to the number in an entire row.

9. In biscuit removal means, a conveyor carrying successive transverse rows of biscuit, means operating transversely of said conveyor for successively removing therefrom from opposite sides thereof each the portions of said transverse rows of biscuit located upon the related longitudinal portion of said conveyor.

10. In apparatus for the manufacture of food products, such as biscuits, the combination of a conveyor adapted to carry biscuits thereon in transverse rows, and mechanism for removing the biscuits from the conveyor, this mechanism including means on each side of the conveyor operating in a direction at right angles to the direction of conveyor movement, said means acting simultaneously to remove portions of a row of biscuits from the conveyor in opposite directions.

11. In apparatus for the manufacture of food products, such as biscuits, the combination of a conveyor adapted to carry biscuits thereon in transverse rows, and means on each side of the conveyor operating transversely thereof to remove portions of a row of biscuits from the conveyor in opposite directions, the said means including a plurality of members adapted to engage individual biscuits in the portion of the row.

12. In apparatus for the manufacture of food products, such as biscuits, the combination of a conveyor adapted to carry biscuits arranged thereon in successive transverse rows, and mechanism for removing the biscuits from the conveyor, this mechanism including a device on each side of the conveyor arranged opposite adjacent pans of the latter, these devices acting simultaneously to remove portions of a row of biscuits from the pans in opposite directions from the conveyor.

13. In apparatus for the manufacture of food products, such as biscuits, the combination of a conveyor adapted to carry biscuits thereon in transverse rows, an inspection table on each side of the conveyor, and means for removing successive transverse rows of biscuits from the conveyor and depositing them on the inspection tables, said means including devices operating simultaneously along different paths and each device acting to transfer a portion of a row of biscuits from the conveyor to a table.

In testimony whereof I affix my signature.

EARL P. WEBSTER.